(12) United States Patent
Ferris et al.

(10) Patent No.: US 6,698,172 B2
(45) Date of Patent: Mar. 2, 2004

(54) LAWN MOWER SUSPENSION ASSEMBLY

(75) Inventors: David Ferris, Oneida, NY (US); Todd B. Gordon, Hickory, NC (US); Henry Nordberg, Oneida, NY (US)

(73) Assignee: Ferris Industries, Inc., Munnsville, NY (US)

( * ) Notice: Subject to any disclaimer, the term of this patent is extended or adjusted under 35 U.S.C. 154(b) by 106 days.

(21) Appl. No.: 09/978,946

(22) Filed: Oct. 16, 2001

(65) Prior Publication Data

US 2002/0023420 A1 Feb. 28, 2002

Related U.S. Application Data (60) Division of application No. 09/359,537, filed on Jul. 22, 1997, now Pat. No. 6,460,318, which is a continuation-in-part of application No. 09/144,499, filed on Aug. 31, 1998, now Pat. No. 5,946,893, said application No. 09/144,499, is a continuation-in-part of application No. 09/119,818, filed on Jul. 21, 1998, now Pat. No. 6,170,242.

(60) Provisional application No. 60/063,362, filed on Oct. 28, 1997, and provisional application No. 60/053,403, filed on Jul. 22, 1997.

(51) Int. Cl.[7] .............................................. A01D 34/03
(52) U.S. Cl. .................................. 56/15.8; 56/DIG. 10
(58) Field of Search ........................ 56/15.8, DIG. 22, 56/DIG. 10, 15.6, 15.7, DIG. 3; 280/124.179, 124.136, 124.141

(56) References Cited

U.S. PATENT DOCUMENTS

| | | | |
|---|---|---|---|
| 1,826,113 A | | 10/1931 | Winsor |
| 2,032,657 A | | 3/1936 | Fredrickson |
| 2,063,704 A | * | 12/1936 | Slack ..................... 280/86.754 |
| 2,209,804 A | * | 7/1940 | Ashley ........................ 180/209 |
| 2,482,216 A | | 9/1949 | Rust |
| 2,709,881 A | | 6/1955 | Goss |

(List continued on next page.)

Primary Examiner—Árpád Fabián Kovács
(74) Attorney, Agent, or Firm—Michael Best & Friedrich LLP (57) ABSTRACT

A lawn mower includes a front wheel suspension system as well as a rear wheel suspension system. The front wheel suspension system includes upper and lower suspension struts that are pivotably connected between a main frame of the lawn mower and a longitudinal suspension strut that is connected to a front wheel. A spring is connected between an extension of the upper suspension strut and a front transverse member of the main frame. The rear wheel suspension system includes upper and lower links that are pivotably connected between vertical struts that are connected between upper and lower frame members of the main frame and a motor mount. A spring is connected between a spring bracket extending from the upper frame member and either the motor mount or a motor mounted in the motor mount. In order to prevent scalping while turning, a floating cutter deck is suspended from the front and rear wheel suspension systems rather than from the main frame or chassis of the mower. An alternative embodiment includes a hinged pivoting subframe with springs between the main frame and the left and right halves of the subframe. In this alternative embodiment, the front of the cutter deck is suspended from the main frame while the rear of the cutter deck is suspended from the rear wheel suspension system.

33 Claims, 11 Drawing Sheets

U.S. PATENT DOCUMENTS

| | | | |
|---|---|---|---|
| 2,805,079 A | | 9/1957 | Vostrez |
| 2,859,578 A | | 11/1958 | Hall |
| 2,874,972 A | | 2/1959 | Andersen et al. |
| 2,902,290 A | * | 9/1959 | Hausmann ............ 280/124.127 |
| 3,024,041 A | | 3/1962 | Maruhn |
| 3,159,959 A | | 12/1964 | Mathews |
| 3,250,064 A | | 5/1966 | Kamlukin |
| 3,292,945 A | * | 12/1966 | Dangauthier ............. 280/6.159 |
| 3,408,089 A | | 10/1968 | Edwards |
| 3,686,840 A | | 8/1972 | Root |
| 3,696,594 A | | 10/1972 | Freimuth et al. |
| 3,719,371 A | | 3/1973 | Musgrave |
| 3,913,696 A | | 10/1975 | Kennedy et al. |
| 3,940,161 A | | 2/1976 | Allison |
| 3,970,162 A | * | 7/1976 | Le Salver et al. .......... 180/291 |
| 4,077,191 A | | 3/1978 | Pittinger, Sr. et al. |
| 4,106,269 A | | 8/1978 | Knudson |
| 4,159,128 A | | 6/1979 | Blaine |
| 4,159,613 A | | 7/1979 | Knudson et al. |
| 4,301,881 A | | 11/1981 | Griffin |
| 4,657,271 A | * | 4/1987 | Salmon ............... 280/124.139 |
| 4,724,661 A | | 2/1988 | Blakeslee et al. |
| 4,787,646 A | | 11/1988 | Kamlukin et al. |
| 4,809,796 A | | 3/1989 | Yamaoka et al. |
| 4,843,804 A | | 7/1989 | Wellman |
| 4,869,057 A | | 9/1989 | Siegrist |
| 4,911,466 A | * | 3/1990 | Blair ................... 280/124.146 |
| 4,957,307 A | | 9/1990 | Gandiglio |
| 4,978,131 A | * | 12/1990 | Edahiro et al. ....... 280/124.142 |
| 5,129,218 A | | 7/1992 | Youngberg et al. |
| 5,197,755 A | | 3/1993 | Quick |
| 5,305,588 A | | 4/1994 | Minato et al. |
| 5,322,143 A | | 6/1994 | Curran |
| 5,355,664 A | | 10/1994 | Zenner |
| 5,367,864 A | | 11/1994 | Ogasawara et al. |
| 5,431,243 A | | 7/1995 | Richards |
| 5,433,066 A | | 7/1995 | Wenzel et al. |
| 5,435,591 A | | 7/1995 | Lee |
| 5,507,138 A | | 4/1996 | Wright et al. |
| 5,765,858 A | | 6/1998 | Kawagoe et al. |
| 5,799,475 A | | 9/1998 | Borling et al. |
| 5,865,020 A | | 2/1999 | Busboom et al. |
| 5,873,224 A | | 2/1999 | Murakawa et al. |
| 5,947,495 A | | 9/1999 | Null et al. |

* cited by examiner

FIG. 16

LAWN MOWER SUSPENSION ASSEMBLY

REFERENCE TO RELATED APPLICATIONS

This is a divisional patent application of U.S. patent application Ser. No. 09/359,537, filed on Jul. 22, 1999 and issued on Oct. 8, 2002 as U.S. Pat. No. 6,460,318, which is a continuation-in-part patent application of (1) U.S. patent application Ser. No. 09/144,499, filed Aug. 31, 1998, now U.S. Pat. No. 5,946,893 which in turn claims benefit from Provisional Patent Application Serial No. 60/063,362, filed on Oct. 28, 1997; (2) application Ser. No. 09/119,818, filed on Jul. 21, 1998, now U.S. Pat. No. 6,170,242 which in turn claims benefit from Provisional Patent Application Serial No. 60/053,403 flied on Jul. 22, 1997; and (3) U.S. patent application Ser. No. 08/898,801, filed on Jul. 23, 1997, now U.S. Pat. No. 6,062,333 which in turn claims benefit from Provisional Patent Application Serial No. 60/022,865 filed on Jul. 26, 1996, all of which are incorporated herein by reference.

FIELD OF THE INVENTION

The invention pertains to the field of lawnmowers. More particularly, the invention pertains to lawnmowers of the riding type having both front and rear independent suspension.

BACKGROUND OF THE INVENTION

The present invention is described with respect to its use on riding lawn mowers, particularly self-propelled machines fitted with rotating blades for cutting turf grasses. In the most favored typical design, the rider sits atop a three or four wheeled machine, while one or more blades rotate about a vertical axis within a mower deck mounted at the underside of the machine, to cut grasses as the machine moves across the surface being mowed.

In many typical riding mowers, the cutter deck is configured as either a ground-following deck or a floating deck. A ground-following deck typically rides on either two or four caster wheels and follows the contours of the ground. A floating deck is hung between the front and rear wheels and beneath the chassis by chains, links or other devices, being adapted to rise up when skids, wheels, rollers and the like attached to the underside of the deck make contact with the lawn surface. Generally, the intent for such deck suspension system is to avoid continuing contact with the earth surface. The distance of the cutter deck from the earth surface is determined by the elevation of the chassis. When the mower crosses an earth-surface rise which is relatively severe, that is, short in horizontal length compared to the wheel base of the mower and great in height compared to the pre-set elevation of the mower deck, the deck frequently makes contact with the earth surface. Then, it is intended that the deck rises or "floats" upwardly, so the rotary blades do not hit the earth surface. Such designs work well for many kinds of unevenness, but scalping for certain earth surfaces and mower movements is still a problem. Even if there is no scalping, a variation of the height of the cutter deck relative to the earth surface is not wanted, as it varies the height of the cut grass.

Many typical prior art mowers have the wheels rigidly attached to the chassis. Thus, unevenness in the earth surface imparts a lot of up and down chassis motion. Some prior art mowers employ center-pivoting axles which somewhat reduce the vertical motion of the chassis when one wheel encounters unevenness. The related applications describe a preferred transmission steerable mower which has rear drive wheels which are independently driven and spring suspended from the chassis, and which has free pivoting caster front wheels, mounted at the outer ends of a pivotable axle or subframe. The cutter deck is suspended between the front and rear wheels.

Mowers with improved spring suspension systems reduce the amount of chassis motion when one or both drive wheels of a mower encounter unevenness in the surface being mowed. Drive wheel traction is improved. However, depending on the particulars of any non-rigid suspension system, the chassis is enabled to roll relative to the earth surface, such as, for example, when the mower is sharply turning or when the mower is traversing a steep hillside. When a mower rolls, a floating cutter deck moves closer to the earth surface and there can be a tendency for scalping of the turf by the cutter deck. An improvement in one of the related applications connects the cutter deck with the rear wheels, thereby ensuring that the cutter deck moves relative to the wheels and ground instead of relative to the chassis of the mower.

SUMMARY OF THE INVENTION

Briefly stated, a lawn mower includes a front wheel suspension system as well as a rear wheel suspension system. The front wheel suspension system includes upper and lower suspension struts that are pivotably connected between a main frame of the lawn mower and a longitudinal suspension strut that is connected to a front wheel. A spring is connected between an extension of the upper suspension strut and a front transverse member of the main frame. The rear wheel suspension system includes upper and lower links that are pivotably connected between vertical struts that are connected between upper and lower frame members of the main frame and a motor mount. A spring is connected between a spring bracket extending from the upper frame member and either the motor mount or a motor mounted in the motor mount. In order to prevent scalping while turning, a floating cutter deck is suspended from the front and rear wheel suspension systems rather than from the main frame or chassis of the mower. An alternative embodiment includes a hinged pivoting subframe with springs between the main frame and the left and right halves of the subframe. In this alternative embodiment, the front of the cutter deck is suspended from the main frame while the rear of the cutter deck is suspended from the rear wheel suspension system.

According to an embodiment of the invention, a mower includes a main frame; first and second front wheels; and first and second front suspension systems connecting the first and second front wheels, respectively, to the main frame.

DESCRIPTION OF THE PREFERRED EMBODIMENT

Figure 1:
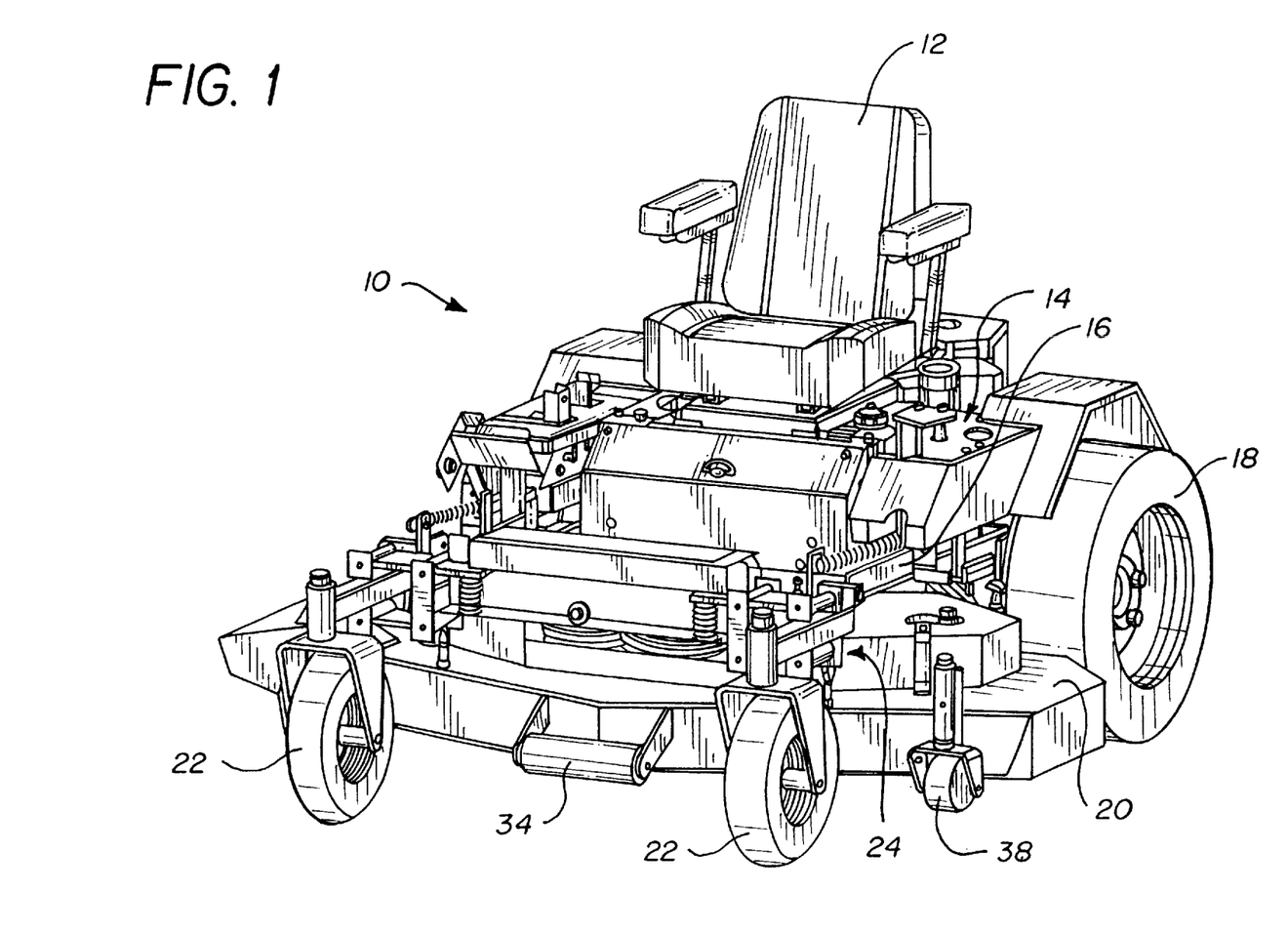
FIG. 1 shows a perspective view of a lawn mower having a front suspension system according to an embodiment of the present invention.
Figure 2:
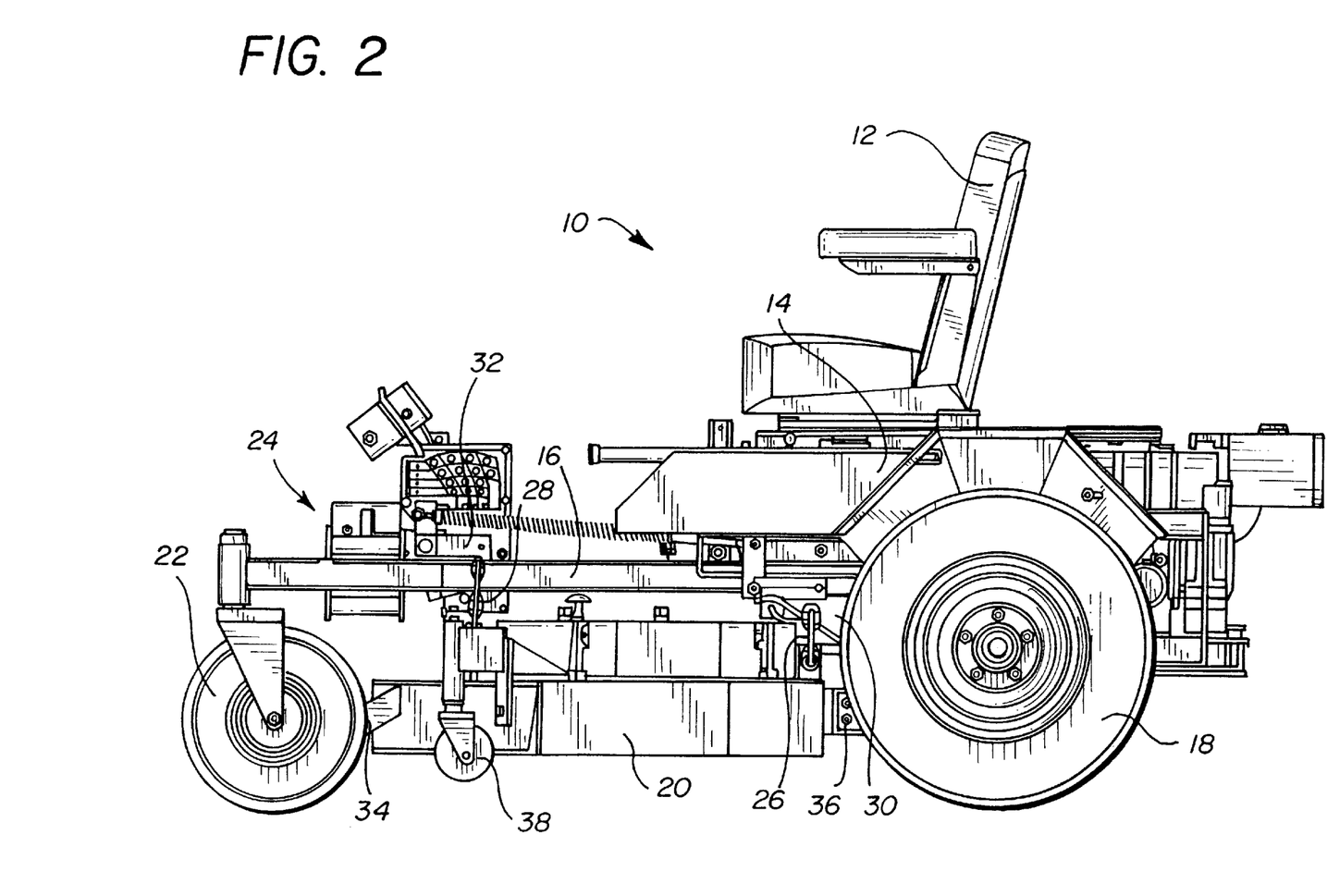
FIG. 2 shows a side elevation view of the lawn mower of FIG. 1.

Referring to FIGS. 1–2, a lawn mower 10 includes a seat 12 connected to a chassis 14. Chassis 14 in turn rests on a main frame 16. Two rear wheels 18 are connected to main frame 16 by the independent suspension (not shown) as described in U.S. patent application Ser. No. 09/119,818. Two front wheels 22 are connected to main frame 16 via a front suspension system, shown generally at 24. A floating cutter deck 20 is preferably suspended beneath main frame 16 by rear suspension chains 26 and front suspension chains 28. Each rear suspension chain 26 is preferably connected to a rear wheel bracket 30 which is "wheel-side" of the rear independent suspension system. Each front suspension chain is preferably connected to a deck height adjustment mount 32 which is part of front suspension section 24. Suspending cutter deck 20 from the "wheel-side" of the front and rear independent suspensions ensures that cutter deck 20 moves vertically up and down in response to the vertical motion of front wheels 22 and rear wheels 18, which in turn are responsive to the terrain being mowed. Scalping and uneven cuts of the grass are thus prevented.

Although the mower of the present invention can be equipped with either a ground-following cutter deck or a floating cutter deck, using a floating cutter deck with a mower having independent suspension requires additional considerations. Rolling of a lawn mower chassis is induced under certain situations. Among them are: (a) when the mower changes direction while traveling forward and centrifugal force acts laterally at the center of gravity of the machine; (b) when the mower traverses a slope and the gravitational force vector shifts direction relative to the plane of the mower wheel tread, and (c) when the mower travels over a surface undulation, lifting or lowering one or both wheels on one side, thereby rotating the mower chassis in space.

Conventional mowers typically use wheels that are rigidly connected to the chassis. In these mowers, the chassis cannot roll relative to the wheels; therefore, there is no rolling of types (a) and (b). Other conventional mowers have a pivoting front or rear axle at one end, with an opposing end axle rigidly attached to the chassis. In these mowers, the rigidly attached axle limits the chassis roll which the pivoting axle otherwise permits to the extent the chassis is sufficiently rigid. The mower of the present invention, preferably having both front and rear independent wheel suspension systems, beneficially minimizes any rolling of the machine when a wheel passes over certain small bumps and depressions—type (c) rolling. Nonetheless, larger bumps and depressions can induce rolling.

Figure 9:
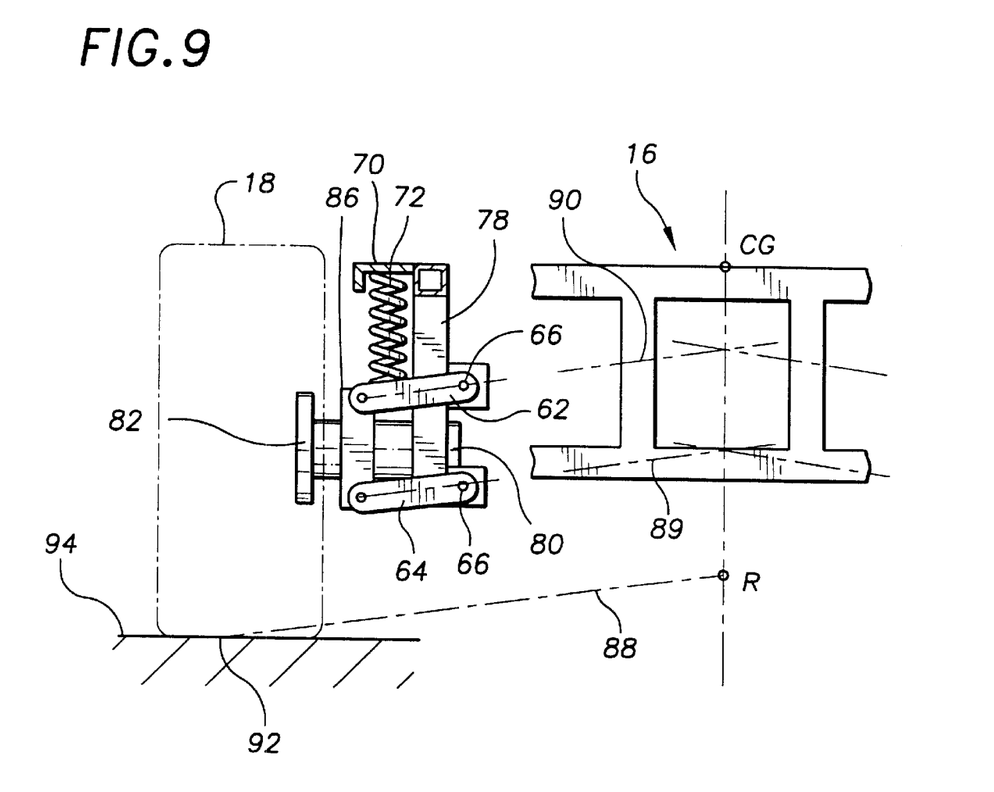
FIG. 9 shows a partial rear elevation view of a portion of the rear suspension system of FIG. 6.

As will be explained below, the suspension configuration of FIG. 9 is prone to rolling of types (a) and (b). If cutter deck 20 of mower 10 is suspended from the chassis, i.e., a floating cutter deck, rolling may adversely affect the essential mower function, that is, cutting grass to an even height. In particular, when the chassis rolls and one side moves closer to the earth surface, a cutter deck suspended from the chassis also moves closer to the surface. Therefore, the preferable embodiment of the present invention couples the motion of the cutter deck to the motion of a sprung wheel rather than directly to the chassis, thereby reducing the change in cutter deck height relative to the mowed surface when the chassis rolls.

Due to the large cutting width preferred in commercial mowers and the distance between the front wheels 22, rocks or other uneven terrain features that are avoided by front wheels 22 can damage cutter deck 20. Cutter deck 20 therefore preferably includes a front roller 34, a rear roller 36 (partially hidden by rear wheel 18 in FIG. 2), and front caster wheels 38 that protect cutter deck 20 from damage.

Figure 3:
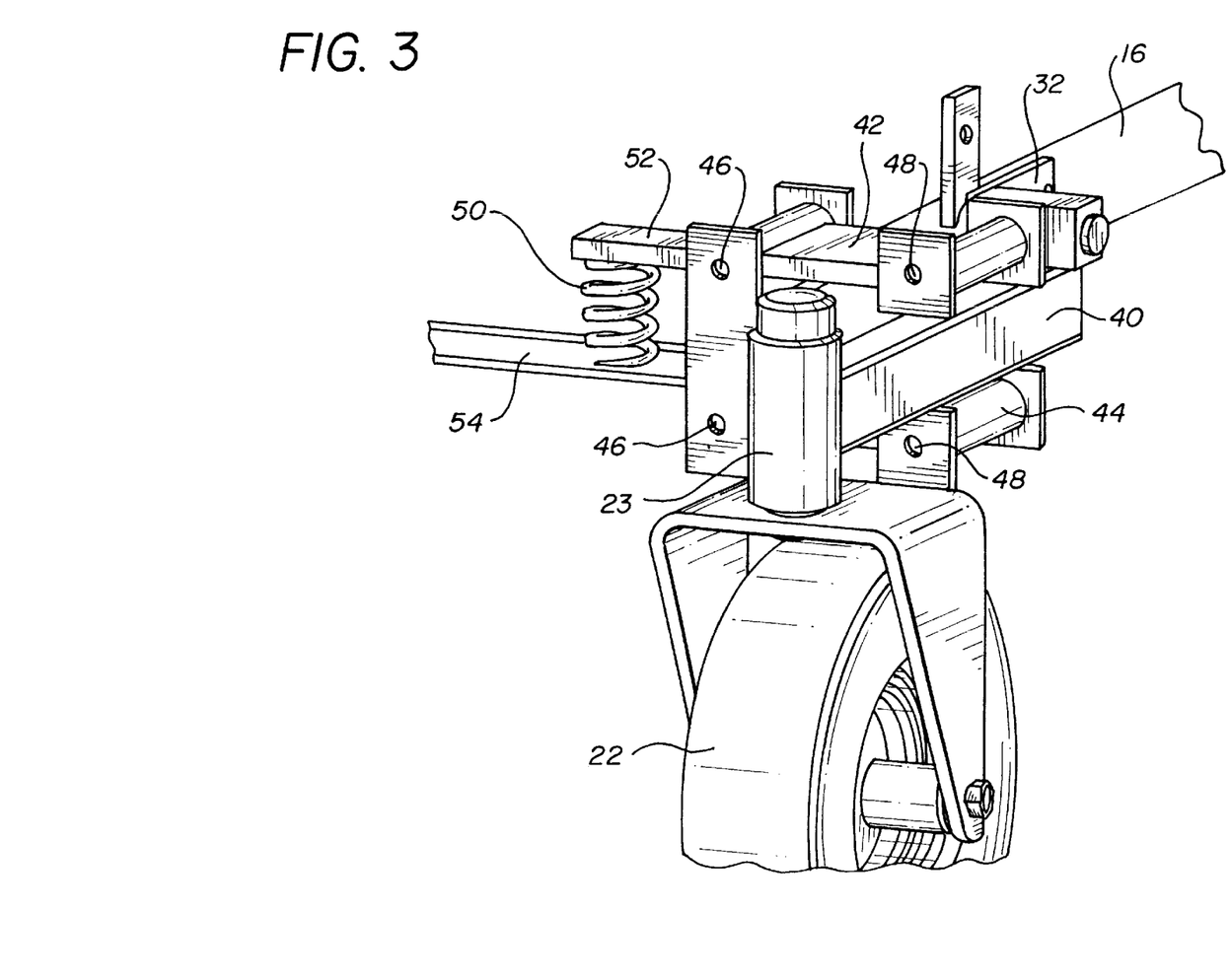
FIG. 3 shows a sectional perspective view of the front suspension system of the present invention.
Figure 4:
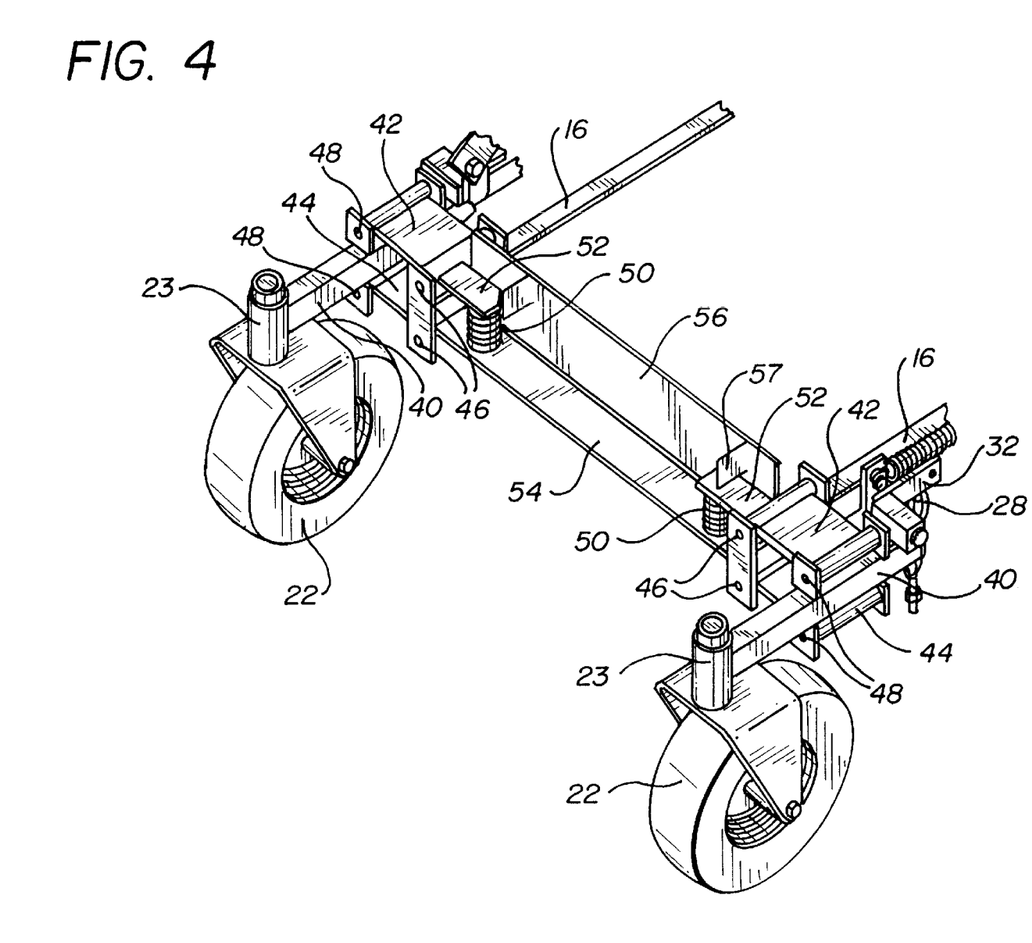
FIG. 4 shows a sectional perspective view of the front suspension system of the present invention.
Figure 5:
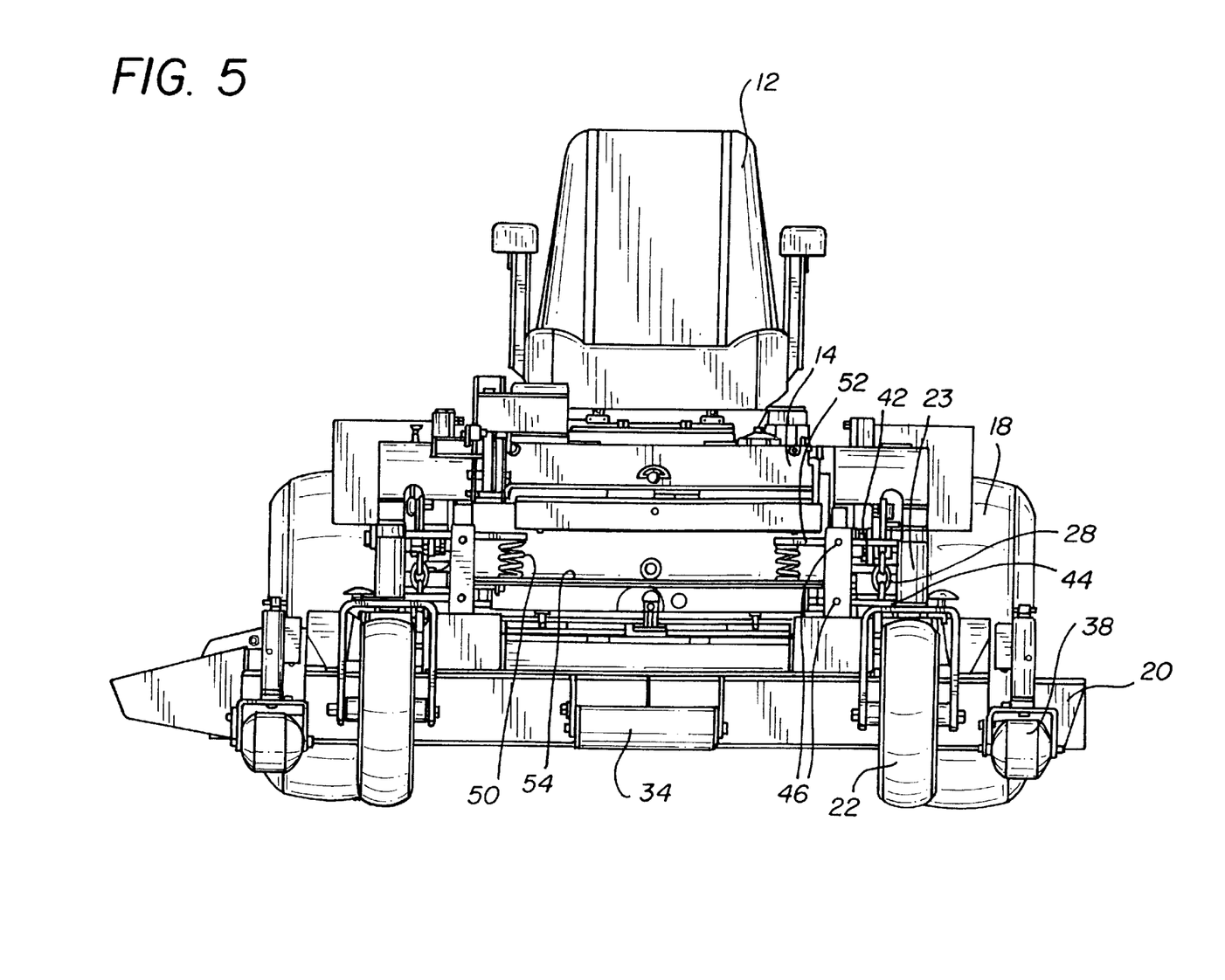
FIG. 5 shows a front elevation view of the lawn mower of FIG. 1.
Figure 6:
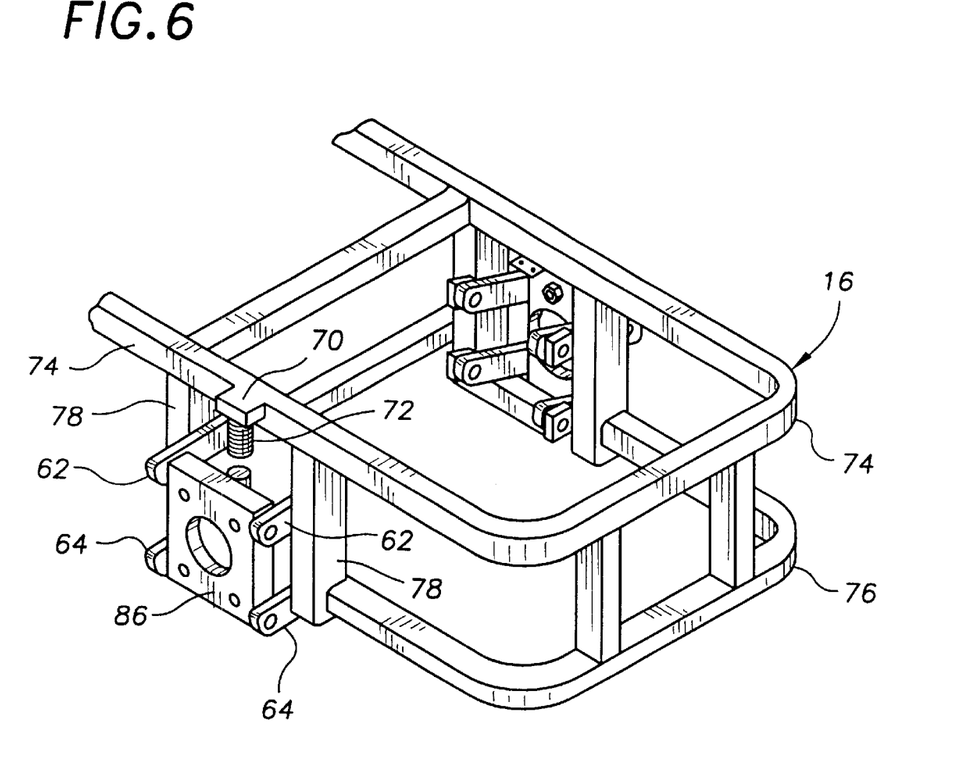
FIG. 6 shows a partial perspective view of a rear suspension system according to an embodiment of the present invention.
Figure 7:
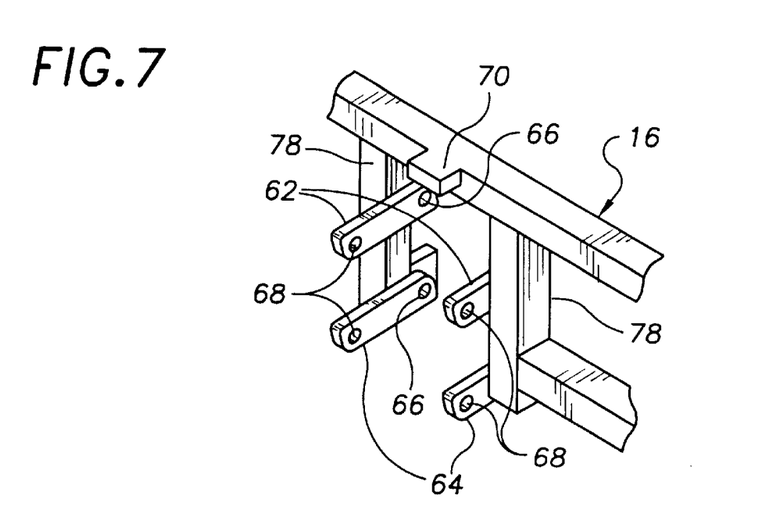
FIG. 7 shows a partial perspective view of a portion of the rear suspension system of FIG. 6.

Referring to FIGS. 3–5, front suspension system 24 includes a longitudinal suspension strut 40 that is connected to main frame 16 via an upper suspension strut 42 and a lower suspension strut 44. Front wheel 22 is connected to longitudinal strut 40 via a trunnion 39. Upper and lower suspension struts 42, 44 pivotably connect to main frame 16 at a plurality of main frame pivot points 46 and pivotably connect to longitudinal suspension strut 40 at a plurality of front suspension pivot points 48. A spring 50 is fixed between a spring bracket 52 of upper suspension strut 42 and a front transverse member 54 of main frame 16 so that upward movement of suspension system 24 compresses spring 50 between spring bracket 52 and front transverse member 54. A portion 57 of a member 56 is spaced approximately ¼ inch above spring bracket 52 when spring 50 is not compressed. In the embodiment shown in FIG. 1, member 56 is used to provide support for a foot panel for the user of mower 10. Upper and lower suspension struts 42, 44 are preferably of equal length so that the suspension travel does not change the perpendicularity of front wheel 22 to the ground.

As front wheels 22 move vertically up and down in response to the terrain, the front of cutter deck 20, being connected to longitudinal suspension strut 40 via adjustment mount 32, moves vertically up and down in response to the vertical motion of front wheels 22. Main frame 16 is isolated from the vertical motion of front wheels 22 by front suspension system 24.

Figure 8:
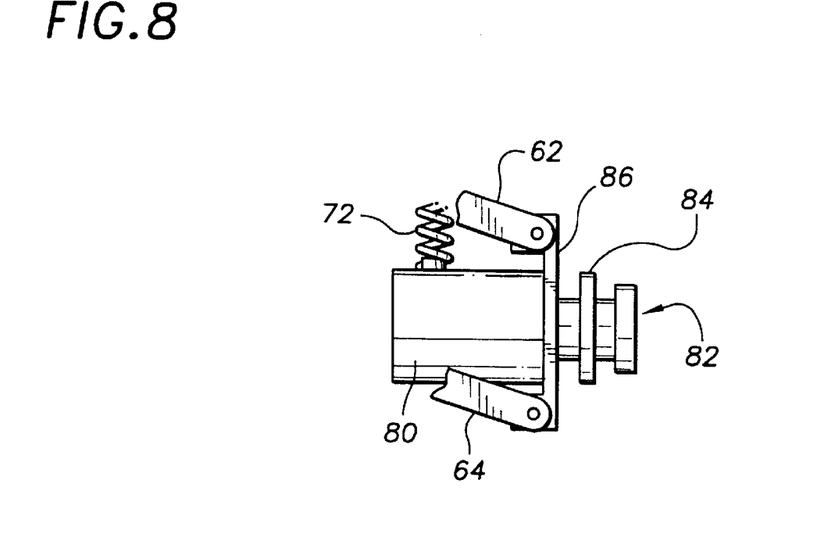
FIG. 8 shows a partial side elevation view of a portion of a rear suspension system according to an embodiment of the present invention.

Referring to FIGS. 6–9, a rear suspension system for mower 10 includes a motor mount 86 connected to main frame 16 via upper links 62 and lower links 64. Two struts 78 join an upper frame member 74 of main frame 16 to a lower frame member 76 of main frame 16. Upper and lower links 62, 64 are connected to struts 78 at main frame pivot points 66 and to motor mount 86 at rear suspension pivot points 68. Upper and lower links 62, 64 are shown in this embodiment as being of equal length. A spring 72 is captured between a spring bracket 70 of upper frame member 74 and a motor 80. FIG. 8 additionally shows an optional disk 84 on a wheel hub 82 that is used with disk brakes instead of the more conventional band drum brakes typically used on prior art lawn mowers.

Referring specifically to FIG. 9, a roll center is an imaginary point about which a mower with movable suspension elements tends to roll when subjected to lateral forces. A roll axis of the mower runs through the front and rear roll centers. The location of a roll center R for the rear wheel suspension system is determined by examining the intersection of an upper link phantom line 90 and a lower link phantom line 89. Line 90 runs through the pivot points for upper link 62 while line 89 runs through the pivot points for lower link 64. A ground contact phantom line 88 runs from a ground contact point 92, representing the contact between rear wheel 18 and ground 94, to the intersection of lines 90 and 89. In the embodiment described above, where upper and lower links 62, 64 are of equal length, lines 90 and 89 intersect at infinity. Line 88 therefore intersects lines 90 and 89 at infinity; line 88 is thus parallel to lines 90 and 89. The intersection of line 88 with a vertical plane passing through a center of gravity (mass) of the mower is the location of roll center R.

In this embodiment, roll center R is substantially lower in elevation than the center of gravity CG of the mower. The location of roll center R can be moved vertically by changing the lengths and angles of the link assemblies. With roll center R significantly below center of gravity CG, the mower tends to sway or rock to the side when turning. Sway bars (not shown), also known as anti-sway or anti-roll bars, are optionally added to this equal-link-length suspension to inhibit swaying during turning. Such bars are typically torsion bars or other elastic structure which, when one wheel moves closer to the chassis, resist such motion with a force, the reaction to which is applied to the opposite wheel. Notwithstanding the tendency to roll, the FIG. 9 suspension provides a better vehicle ride and absorption of bumps compared to an unequal link-length suspension. The FIG. 9 suspension also minimizes lateral motion when the mower load changes, such as when an operator mounts or dismounts the mower, removes a grass-catcher bag, or when there are changes in the mower's vertical momentum due to uneven terrain.

Figure 10:
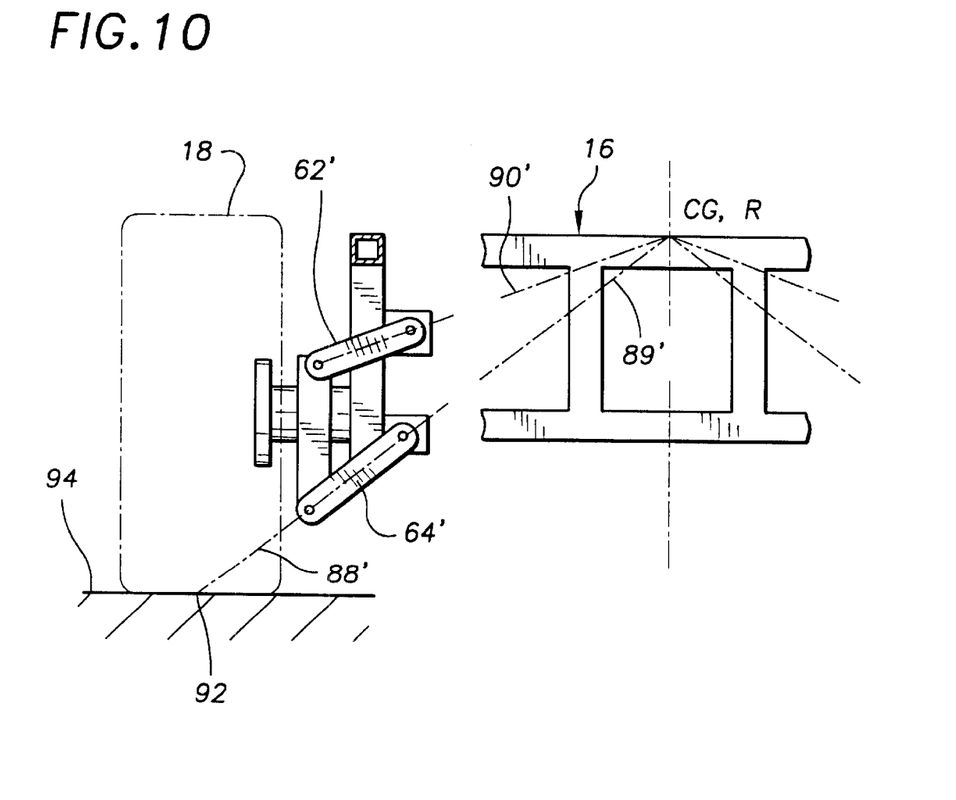
FIG. 10 shows a partial rear elevation view of a portion of a rear suspension system according to an embodiment of the present invention.

Referring to FIG. 10, an embodiment is shown with unequal link lengths. An upper link 62' is shorter than a lower link 64', with the lengths of links 62', 64' preferably determined such that the roll center R and the center of gravity CG substantially coincide. As shown in the figure, phantom lines 90' and 89' intersect at R, so ground contact line 88' intersects the vertical plane passing through the center of gravity CG at the center of gravity CG. This configuration minimizes the roll tendency of the mower during turning.

Figure 11:
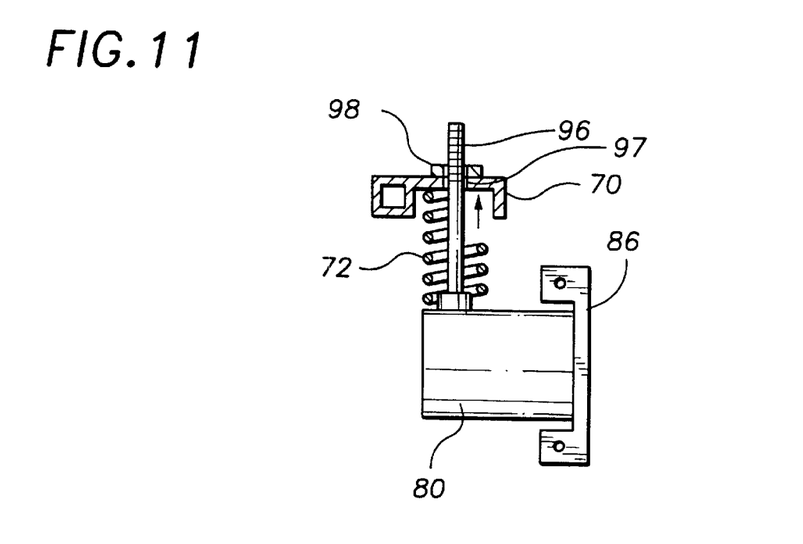
FIG. 11 shows a partial sectional view of a pre-compressed spring used a the rear suspension system according to an embodiment of the present invention.

Referring to FIG. 11, a way of pre-compressing spring 72 is shown. Pre-compression is desirable to lessen the movement of the mower chassis when the mower operator mounts and dismounts the mower. Pre-compression is preferably accomplished by pivotably attaching a threaded guide rod 96 to motor 80. Rod 96 extends through a hole 97 in spring bracket 70 with a nut 98 on the threaded end of rod 96. Nut 98 is preferably adjustable so that the amount of pre-compression can be changed when required.

Figure 12:
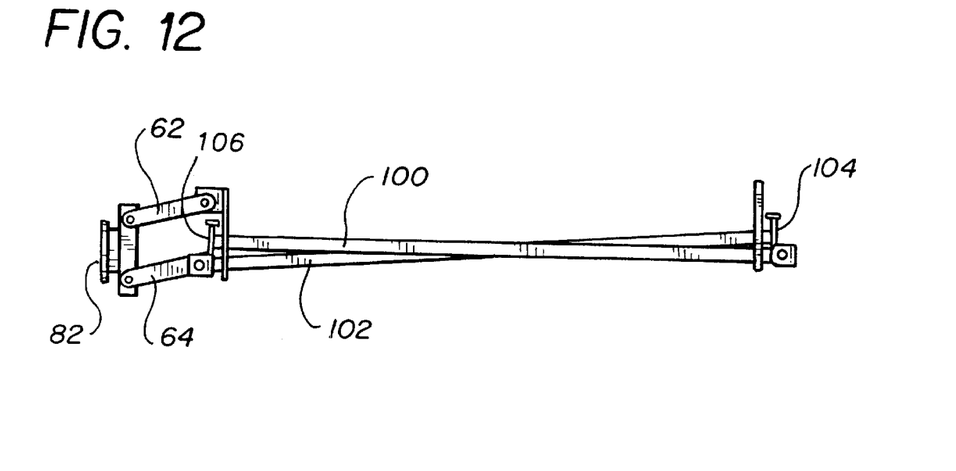
FIG. 12 shows a torsion bar suspension system used for the front or rear suspension systems of the present invention.

Referring to FIG. 12, a torsion bar suspension is shown connected to wheel hub 82 at the left rear wheel location for mower 10. A first torsion bar 102 is hooked to lower link 64 at one end, while another end attaches to an adjuster 104, which permits adjustment of the tension of torsion bar 102. In similar fashion, a second torsion bar 100 is hooked to the lower link 64 on the right side of mower 10, with the other end of torsion bar 100 being attached to an adjuster 106 which is connected to lower link 64 on the left side of mower 10. The right side wheel hub and upper and lower links are not shown in FIG. 12. The torsion bars 100, 102 replace the springs 72 to provide the rear wheel suspension. Although the torsion suspension is shown for the rear wheels, it can be used on the front wheels as well. For the front suspension system shown in FIG. 4, front transverse member 54 and springs 50 are replaced by the torsion bars in the manner just described with respect to the rear suspension system.

Figure 13:
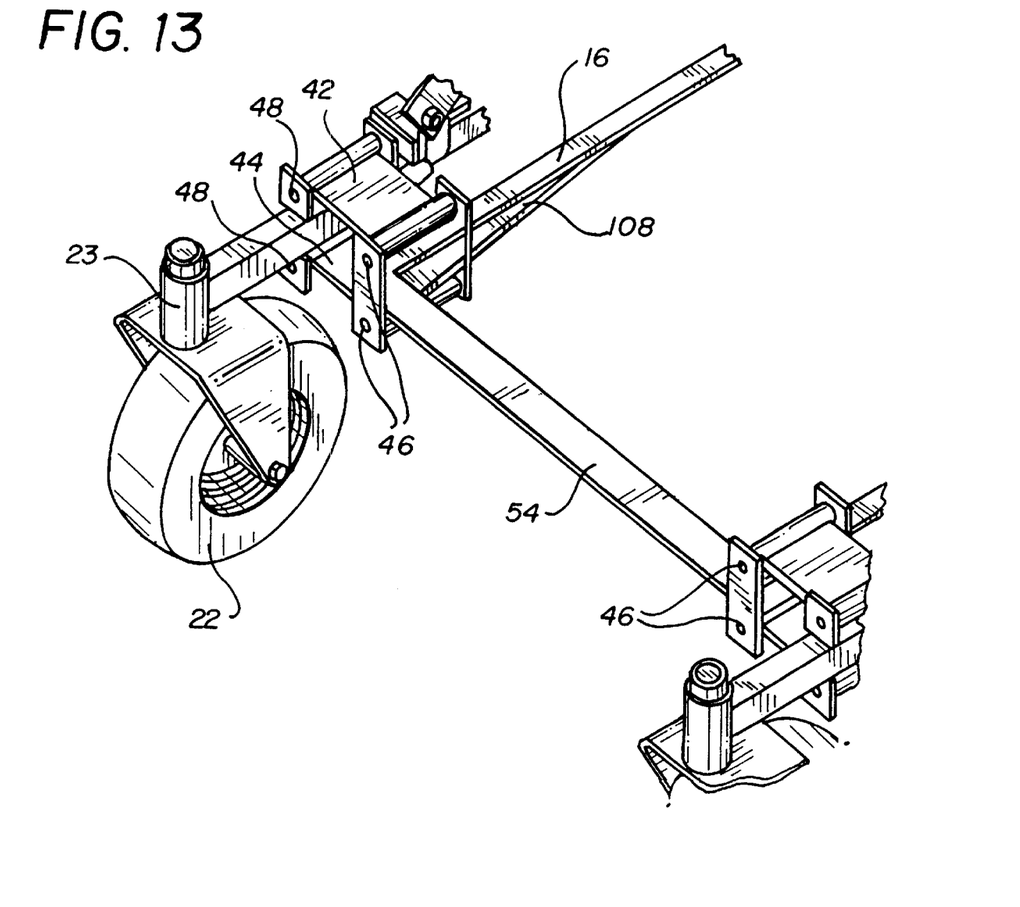
FIG. 13 shows a sectional perspective view of an alternative embodiment of the front suspension system of the present invention.

Referring to FIG. 13, an alternative embodiment of the front suspension system includes a torsion bar 108 attached to lower suspension strut 44 near the lower main frame pivot point 46. Torsion bar 108 is approximately 1.5 to 2.5 feet (45 to 76 cm) long and extends lengthwise to attach to main frame 16. A similar arrangement provides the front suspension for the other front wheel.

Figure 14:
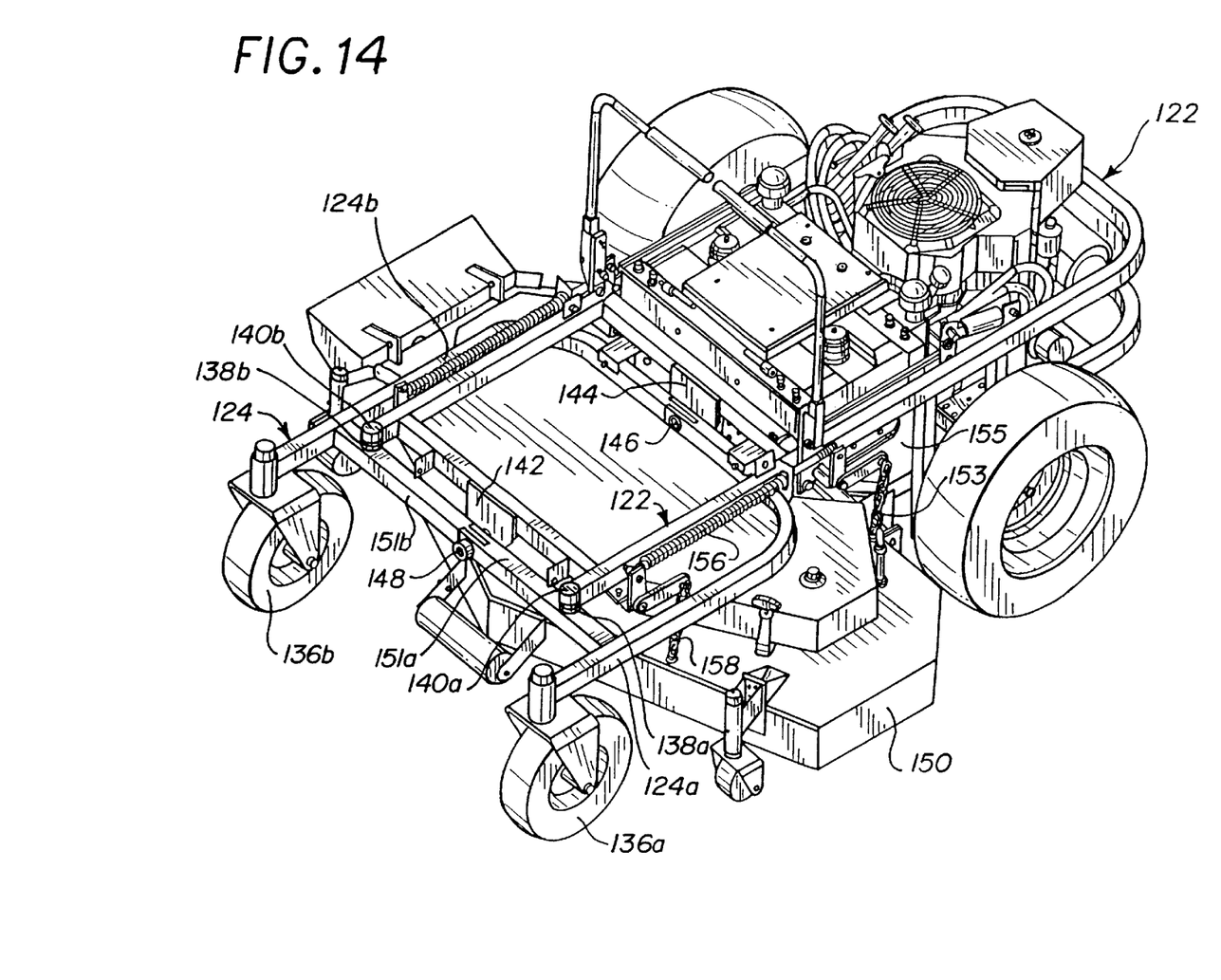
FIG. 14 shows an embodiment of a front suspension system in conjunction with a hinged pivoting subframe according to an embodiment of the present invention.
Figure 15:
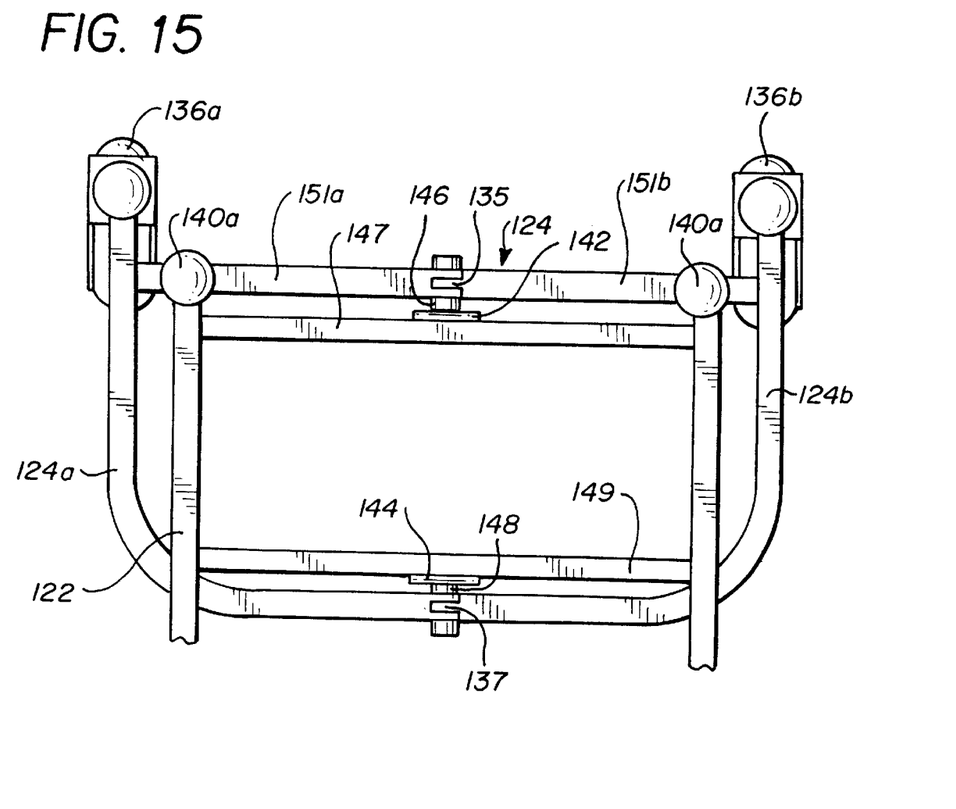
FIG. 15 shows a partial top view of the embodiment of FIG. 14.
Figure 16:
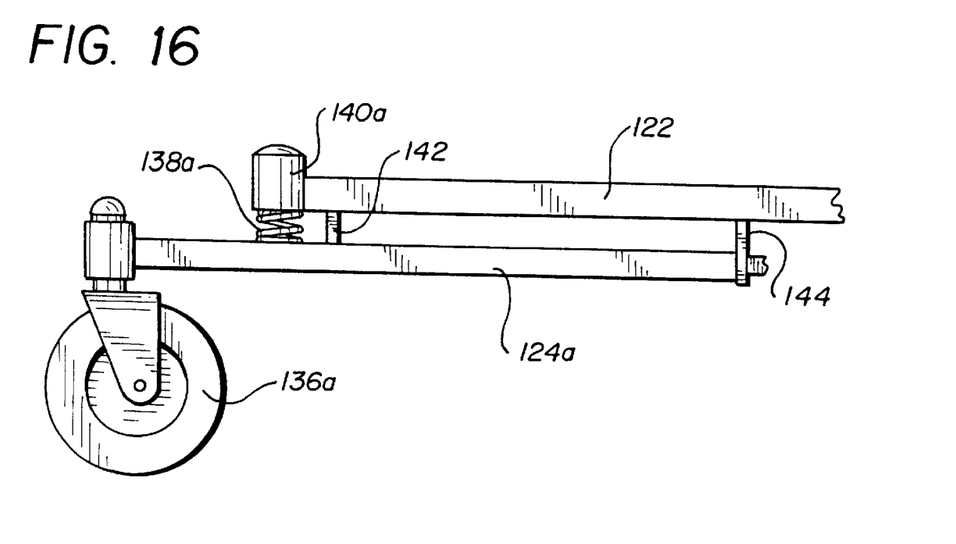
FIG. 16 shows a partial side view of the embodiment of FIG. 14.

Referring to FIGS. 14–16, in another embodiment, a main frame 122 is connected to a pivoting subframe 124 that incorporates a front suspension system. Pivoting subframe 124 includes a left half subframe 124a which is hingeably connected to a right half subframe 124b. Two hinges, such as a front clevis joint 135 and a rear levis joint 137, connect left and right half subframes 124a, 124b to each other. A front pivot pin 146 acts as the clevis pin for front clevis joint 135 while a rear pivot pin 148 acts as the clevis pin for rear clevis joint 137. Front pivot pin 146 is connected to a front transverse member 147 of main frame 122 via a front pivot plate 142, while rear pivot pin 148 is connected to a rear transverse member 149 of main frame 122 via a rear pivot plate 144.

A left spring pocket 140a, connected to an extension of main frame 122, houses a left spring 138a that abuts a front transverse portion 151a of left half subframe 124a, while a right spring pocket 140b, connected to an extension of main frame 122, houses a right spring 138b that abuts a front transverse portion 151b of right half subframe 124b. Thus, when a left caster wheel 136a rolls into a dip, left half subframe 124a moves with it, not affecting right half subframe 124b or main frame 122. Similarly, when a right caster wheel 136b rolls into a dip, right half subframe 124b moves with it, not affecting left half subframe 124a or main frame 122. Thus, three of the four mower wheels are on the ground at any given time, resulting in a stable, smooth ride with little or no scalping caused by the cutter deck.

In this embodiment, rear suspension chains 153 for a cutter deck 150 are attached to rear wheel brackets 155 via a cutter deck lift assembly 156, while front suspension chains 158 for cutter deck 150 are attached via cutter deck lift assembly 156 to main frame 122. The weight distribution in a lawn mower of this type is approximately 75% in the rear and 25% in the front. Thus, whereas the rear of the cutter deck is preferably connected to the rear wheel brackets instead of the main frame to avoid scalping during sharp turns or over rough terrain, the front of the cutter deck is preferably connected directly to the main frame in this embodiment.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of supporting at least part of a lawnmower over a surface, the method comprising:
   providing a cutter deck coupled to the main frame and having at least one cutter;
   rotating first and second front wheels upon the surface, the first and second front wheels rotatably coupled to first and second portions of a subframe, respectively, the subframe coupled to and pivotable with respect to the main frame;
   moving the subframe, the main frame and the cutter deck over the surface;
   pivoting the first portion of the subframe independently with respect to the second portion of the subframe;
   moving the first front wheel up and down with respect to the main frame independently of movement of the second front wheel by pivoting the first portion of the subframe;
   pivoting the second portion of the subframe independently with respect to the first portion of the subframe;
   moving the second front wheel up and down with respect to the main frame independently of movement of the first front wheel by pivoting the second portion of the subframe; and
   pivoting each of the first and second portions of the subframe independently with respect to the main frame;
   wherein the first and second rear wheels are moved up and down responsive to movement of the subframe and the cutter deck over the surface.

2. The method as claimed in claim 1, wherein the first and second portions of the subframe are on opposite sides of the lawnmower.

3. The method as claimed in claim 1, further comprising:
   moving a first rear wheel up with respect to the main frame independently of movement of a second rear wheel;
   moving the first rear wheel down with respect to the main frame independently of movement of the second rear wheel;
   moving the second rear wheel up with respect to the main frame independently of movement of the first rear wheel; and
   moving the second rear wheel down with respect to the main frame independently of movement of the first rear wheel;
   wherein the first and second rear wheels are moved up and down responsive to movement of the main frame and the cutter deck over the surface.

4. The method as claimed in claim 3, further comprising biasing the first and second rear wheels in a downward direction with respective biasing forces upon the first and second rear wheels.

5. The method as claimed in claim 1, further comprising biasing the first and second front wheels in a downward direction with respective biasing forces upon the first and second front wheels.

6. The method as claimed in claim 5, wherein biasing the first and second front wheels includes exerting force from first and second springs coupled to the first and second wheels, respectively.

7. The method as claimed in claim 6, wherein the springs are one of coil springs and torsion bars.

8. The method as claimed in claim 1, wherein the first and second portions of the subframe are coupled together and to the main frame about a pivot.

9. The method as claimed in claim 8, wherein pivoting the first portion includes pivoting the first portion about a longitudinal axis extending in a front-rear direction of the main frame.

10. The method as claimed in claim 9, wherein pivoting the second portion includes pivoting the second portion about the longitudinal axis.

11. The method as claimed in claim 6, wherein biasing the first and second front wheels includes compressing the first and second springs between the first subframe portion and the main frame and between the second subframe portion and the main frame, respectively.

12. A method of supporting at least part of a lawnmower over a surface, the method comprising:
    providing a main frame and a subframe pivotably coupled to the main frame;
    providing a cutter deck and first and second wheels coupled to the subframe, the cutter deck having at least one cutter;
    rotating the first and second wheels;
    rolling the main frame, subframe, and cutter deck over the surface;
    pivoting the first wheel and a first portion of the sub frame in a downward direction with respect to the main frame independently of the second wheel and a second portion of the subframe;
    pivoting the first wheel and the first portion of the subframe in an upward direction with respect to the main frame independently of the second wheel and the second portion of the subframe;
    pivoting the second wheel and the second portion of the subframe in a downward direction with respect to the main frame independently of the first wheel and the first portion of the subframe; and
    pivoting the second wheel and the second portion of the subframe in an upward direction with respect to the main frame independently of the first wheel and the first portion of the subframe;
    wherein the first and second wheels are moved in upward and downward directions responsive to movement of the main frame, the sub frame, and the cutter deck over the surface.

13. The method as claimed in claim 12, wherein pivoting the first and second portions of the subframe includes pivoting the first and second portions of the subframe about a common pivot.

14. The method as claimed in claim 13, wherein the first and second portions of the subframe are coupled to the main frame via the pivot.

15. The method as claimed in claim 12, wherein the first and second wheels are front wheels of the lawnmower.

16. The method as claimed in claim 12, further comprising biasing the first and second portions of the subframe in a downward direction.

17. The method as claimed in claim 16, wherein biasing the first and second portions of the subframe includes compressing first and second springs between the first and second portions of the subframe, respectively, and the main frame.

18. The method as claimed in claim 17, wherein the first and second springs are coil springs.

19. The method as claimed in claim 12, wherein pivoting the first and second portions of the subframe include pivoting the first and second portions about a common axis.

20. The method as claimed in claim 19, wherein the axis extends through a front and rear of the main frame and is substantially centrally located between opposite sides of the main frame.

21. The method as claimed in claim 20, wherein the first and second wheels are mounted upon the first and second portions of the subframe, respectively.

22. A method of supporting at least part of a lawnmower over a surface, the method comprising:

providing a cutter deck, a main frame, a subframe coupled to the main frame and having first and second portions, first and second front wheels coupled to the first and second portions of the subframe, respectively, and first and second rear wheels, the cutter deck having at least one cutter;

rotating the first and second front and rear wheels;

rolling the main frame, subframe, and cutter deck over the surface by rotation of the first and second front and rear wheels upon the surface;

moving the first portion of the subframe in upward and downward directions independently with respect to the second portion of the subframe and the main frame;

moving the first front wheel in upward and downward directions with the first portion of the subframe independently with respect to the second front wheel;

moving the second portion of the sub frame in upward and downward directions independently with respect to the first portion of the subframe and the main frame;

moving the second front wheel in upward and downward directions with the second portion of the subframe independently with respect to the first front wheel;

moving the first rear wheel in upward and downward directions independently with respect to the second rear wheel; and moving the second rear wheel in upward and downward directions independently with respect to the first rear wheel;

wherein the front and rear wheels and the first and second portions of the subframe are moved in upward and downward directions responsive to movement of the main frame and the cutter deck over the surface.

23. The method as claimed in claim 22, further comprising driving the first and second rear wheels with a motor.

24. The method as claimed in claim 22, further comprising biasing the first and second front wheels in a downward direction.

25. The method as claimed in claim 22, wherein moving the first and second portions of the subframe include pivoting the first and second portions.

26. The method as claimed in claim 25, wherein moving the first and second portions of the subframe include pivoting the first and second portions about a common pivot.

27. The method as claimed in claim 26, wherein the first and second portions are coupled to the main frame via the common pivot.

28. The method as claimed in claim 25, wherein pivoting the first and second portions includes pivoting the first and second portions about a longitudinal axis of the main frame extending in a front-rear direction of the main frame.

29. The method as claimed in claim 28, wherein the longitudinal axis of the main frame is substantially centrally located between opposite sides of the main frame.

30. The method as claimed in claim 25, wherein moving the first and second portions of the subframe include pivoting the first and second portions about a first pivot point and a second pivot point located behind the first pivot point with respect to a travel direction of the lawnmower.

31. The method as claimed in claim 22, further comprising biasing each of the first and second portions of the subframe in a downward direction with respective springs between the main frame and the first and second portions of the subframe.

32. The method as claimed in claim 22, wherein:

the first and second portions of the subframe at least partially define first and second independent front wheel suspensions, respectively; and the cutter deck is at least partially suspended from the first and second front wheel suspensions;

the method further comprising:

lifting the cutter deck with respect to the main frame in response to movement of at least one of the first and second front wheels in an upward direction; and lowering the cutter deck with respect to the main frame in response to movement of at least one of the first and second front wheels in a downward direction.

33. The method as claimed in claim 22, wherein:

the first and second rear wheels are coupled to the main frame by first and second rear wheel suspensions, respectively; and the cutter deck is at least partially suspended from the first and second rear wheel suspensions;

the method further comprising:

lifting the cutter deck with respect to the main frame in response to movement of at least one of the first and second rear wheels in an upward direction; and lowering the cutter deck with respect to the main frame in response to movement of at least one of the first and second rear wheels in a downward direction.

* * * * *

UNITED STATES PATENT AND TRADEMARK OFFICE
CERTIFICATE OF CORRECTION

PATENT NO. : 6,698,172 B2
DATED : March 2, 2004
INVENTOR(S) : David Ferris, Todd B. Gordon and Henry Nordberg

Page 1 of 1

It is certified that error appears in the above-identified patent and that said Letters Patent is hereby corrected as shown below:

Title page,
Item [60], Related U.S. Application Data, should read as follows:
-- Division of application No. 09/359,537, filed on July 22, 1999, now Pat. No. 6,460,318, which is a continuation-in-part of application No. 09/144,499, filed on August 31, 1998, now Pat. No. 5,946,893, and application No. 09/898,801, filed July 23, 1997, now Pat. No. 6,062,333, and application No. 09/119,818, filed on July 21, 1998, now Pat. No. 6,170,242.
Provisional application No. 60/063,362, filed on October 28, 1997, and provisional application No. 60/053,403, filed on July 22, 1997 and provisional application No. 60/022,865, filed on July 26, 1996 --.

Signed and Sealed this

Twenty-fifth Day of January, 2005

JON W. DUDAS
*Director of the United States Patent and Trademark Office*